United States Patent [19]

Tompkins

[11] Patent Number: 5,432,495
[45] Date of Patent: Jul. 11, 1995

[54] BEEPER CONTROLLED AUTO SECURITY SYSTEM

[76] Inventor: Eugene Tompkins, 16016 E. Warren, Detroit, Mich. 48224

[21] Appl. No.: 10,465

[22] Filed: Jan. 27, 1993

Related U.S. Application Data

[63] Continuation of Ser. No. 471,965, Jan. 29, 1990, abandoned.

[51] Int. Cl.6 .............................................. B60R 25/10
[52] U.S. Cl. ................................ 340/429; 340/425.5;
340/426; 340/825.69; 379/37; 367/197;
367/199
[58] Field of Search ............... 340/429, 426, 825.31,
340/825.32, 825.69, 825.72, 539, 531, 425.5;
307/10.2, 10.3; 180/287; 455/9, 11.1, 12.1;
379/58, 63, 37-40; 290/38 C; 367/197-199

[56] References Cited

U.S. PATENT DOCUMENTS

| | | | |
|---|---|---|---|
| 3,657,720 | 4/1972 | Avdenko et al. | 290/38 C |
| 3,864,675 | 2/1975 | Colibert | 340/429 X |
| 4,319,230 | 3/1982 | Fowler et al. | 340/426 X |
| 4,322,714 | 3/1982 | Morgan | 340/429 X |
| 4,665,379 | 5/1987 | Howell et al. | 340/426 |
| 4,700,374 | 10/1987 | Bini | 455/12 X |
| 4,754,255 | 6/1988 | Sanders et al. | 340/825.31 X |
| 4,760,402 | 7/1988 | Mizuno et al. | 343/713 |
| 4,809,316 | 2/1989 | Namekawa | 379/58 |
| 4,811,026 | 3/1989 | Bissett | 343/714 X |
| 4,887,064 | 12/1989 | Droni et al. | 340/426 |
| 4,887,091 | 12/1989 | Yamada | 343/714 |
| 4,893,240 | 1/1990 | Karkouti | 290/38 C X |

FOREIGN PATENT DOCUMENTS 0307485  3/1989  European Pat. Off. .
128861  8/1986  Japan .

*Primary Examiner*—Donnie L. Crosland
*Attorney, Agent, or Firm*—John R. Benefiel

[57] ABSTRACT

A beeper controlled auto security system in which a vehicle disabling device such as an ignition kill switch is selectively activated either by a hand held rf transmitter unit or a beeper paging system satellite transmission initiated by a telephone call which may be at a very remote location from the vehicle. A vehicle motion detector is also activated which turns on a monitor transmitter if the vehicle is thereafter moved, enabling detection by a portable monitor receiver carried by the vehicle owner or police vehicles.

4 Claims, 1 Drawing Sheet

BEEPER CONTROLLED AUTO SECURITY SYSTEM

This application is a continuation of application Ser. No. 07/471,965, filed Jan. 29, 1990 now abandoned.

This invention concerns auto security systems designed to deter or prevent thefts of the vehicle.

Many such systems have been devised involving intrusion detectors which trigger various alarms, lock outs, kill switches, etc.

On board radio transmitters have also been devised to enable monitoring the position of a stolen vehicle by police authorities, typically by complex triangulation techniques, requiring elaborate equipment.

The arming of such systems typically requires a manual switch to be set, which often may be found by the thief and turned off.

Many times the switch is not set due to oversight or because the vehicle driver makes a short stop and does not feel arming the system is necessary, although many thefts occur in these instances.

SUMMARY OF THE INVENTION

The present invention comprises a beeper activated auto security system in which a beeper-receiver mounted within the vehicle is selectively caused to be activated, either by a radio transmission from a hand held transmitter at short range from the vehicle, or from a beeper system broadcast satellite over an extremely wide range. In the latter instance, activation of the beeper system by the vehicle owner or operator is by telephone.

In the system disclosed, an acoustic sensor is mounted in the vehicle adjacent the beeper which sensor detects the beeper sound and actuates the vehicle disabler, such as an ignition kill switch. The vehicle may thus be disabled at a distance after a theft has occurred if the security system had not previously been activated.

A motion-vibration sensor is also turned on as a part of the system which detects vehicle movement after the system is activated.

If the motion sensor is triggered, as by the vehicle being moved by towing or being driven after a defeat of the kill switch, a simple radio transmitter is turned on to broadcast a silent alarm signal.

Police vehicles or the vehicle owner are equipped with simple receivers which emit a sound when the transmitted signal is received, getting louder with a reduced distance to enable a stolen car to be found and identified with relatively simple equipment.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
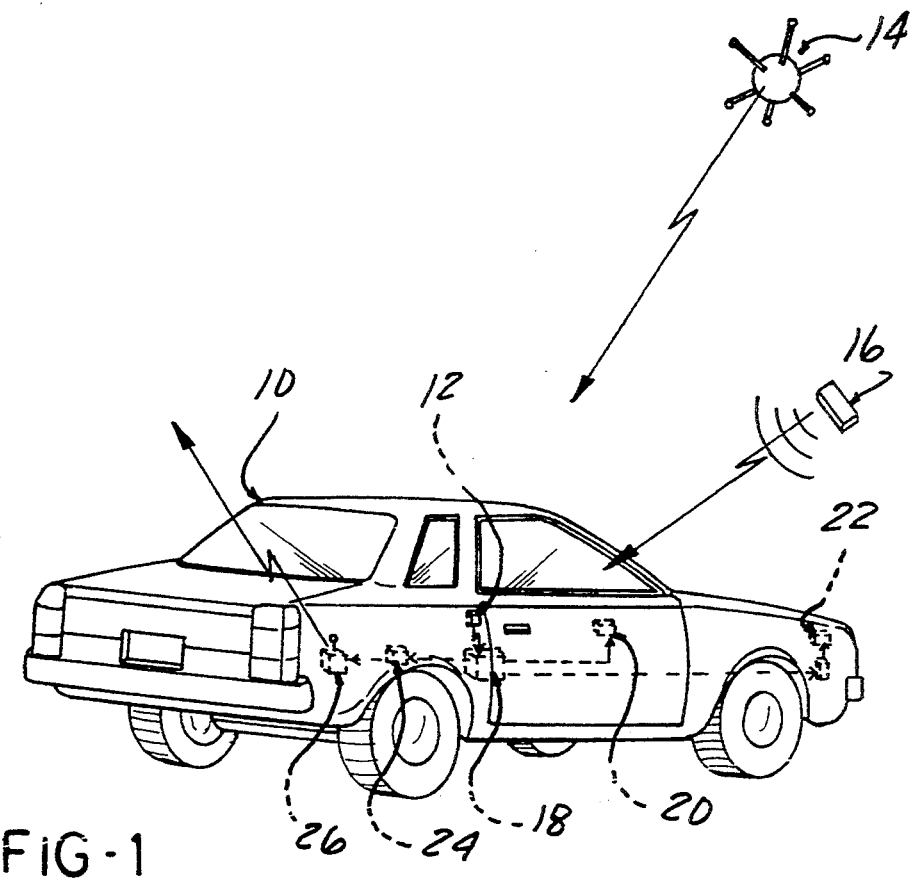
FIG. 1 is a perspective view of an auto vehicle equipped with a security system according to the present invention, and a diagrammatic representation of the remote system activator elements.

Referring to the drawings and particularly FIG. 1, an auto vehicle 10 is depicted, equipped with an auto security system according to the present invention.

The system includes a vehicle mounted "beeper" unit 12, which is a well known device for remote paging of a person carrying the beeper by means of a telephone call placed by a person paging the person carrying the beeper. The telephone call causes a satellite transmission of an rf signal which is received by the beeper unit 12 and will cause the particular beeper to emit a short burst of audible paging signals or "beeps". Such telephone paging may be over a very wide area, some operations extending over several states.

Thus, the beeper unit 12 in the auto 10 may be caused to emit a series of beeps by a remote satellite 14 by means of the telephone system.

Additionally, a small, hand held unit 16 carried by the vehicle operator can alternatively accomplish the same result.

The paging signal from the beeper unit 12 in turn activates the system components 18, which causes activation of one or more vehicle disabling/protective devices, such as an ignition kill switch 20 and a hood lock 22.

Additionally, a motion sensor 24 is turned on which causes activation of an on board short range monitoring radio transmitter 26 if vehicle motion or vibration is subsequently detected.

These components are each well known in and of themselves and suitable devices are commercially available and hence a detailed description is not here set out.

Figure 2:
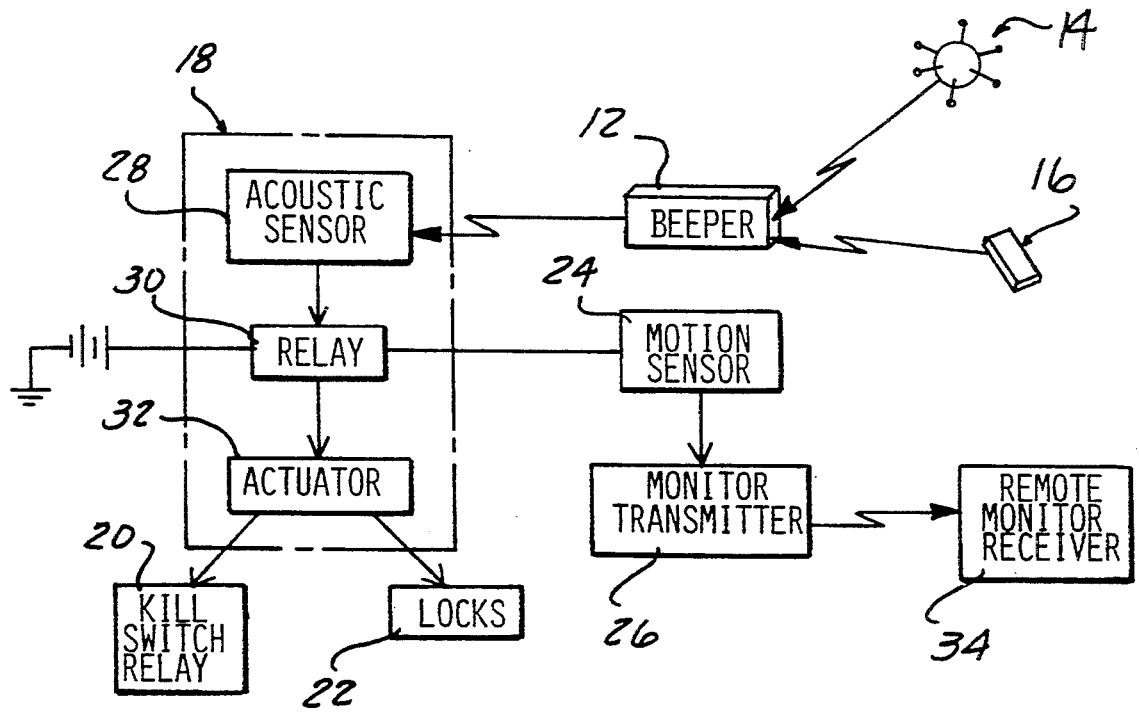
FIG. 2 is a detailed block diagram of the system components.

FIG. 2 shows a block diagram of the arrangement of components.

An acoustic sensor 28 included in the control 18 is tuned to detect the sounds emitted by the beeper 12, caused either from a transmission from the hand held unit 16 or from a satellite in turn triggered by a telephone call. Activation of the acoustic sensor 28 pulls in a relay 30 enabling powering of an actuator 32 which in turn causes tripping of an ignition kill switch and, optionally, a hood lock 22. Other protective devices such as door locks, alarms, (not shown) may also be activated.

The actuator 32 also turns on the motion sensor 24, which if subsequently detecting any movement of the vehicle 10, sends a signal turning on the monitoring transmitter 26. A portable monitor receiver 34 carried by police units or the vehicle owner is tuned to the broadcast frequency of the monitoring transmitter 26. The strength of the signals received from this transmission is distance sensitive, so that the vehicle transmitting can be identified as it is approached. A short effective range broadcast is contemplated, as used by radio controlled appliances such as garage door openers, i.e., 100–300 foot range, in implementing the theft defeating strategy according to the present invention.

Thus, the vehicle operator can secure the car conveniently by operation of the hand held unit 16. A first transmission activates the relay 30, while a second deactivates the relay 30 for normal vehicle operation and process. A special coded frequency transmitter is utilized of a type well known in the art.

If the vehicle is discovered stolen when the owner is close by, operation of the hand held unit 16 can disable the car and initiate the silent alarm radio transmission.

If the owner discovers the vehicle loss later, a telephone call can activate the system through the beeper satellite transmission.

While the above described implementation utilizes off-the-shelf components to minimize costs, it would also be possible to eliminate the beeper-acoustic detection combination by causing the beeper control to operate the relay 30 directly.

I claim:

1. An auto vehicle security system comprising:

selectively activated vehicle disabling means operable when activated to prevent operation of the vehicle;

receiver-disable signal generator means for selectively activating said vehicle disabling means responsive to alternative activating means, said alternative activating means including a portable hand held transmitter selectively activatable to emit an rf signal to said receiver disable signal generator means to activate said receiver-disable signal generator means, and a telephone activated remote transmitter emitting another rf signal transmitted to said receiver-disable signal generator means, whereby said vehicle may selectively be disabled either by operation of said hand held transmitter or by a telephone activated transmission;

said receiver-disable signal generator means comprising a beeper-receiver unit mounted within said vehicle adapted to emit an audible paging signal upon receipt of a signal originating from either of said hand held transmitter or said remote transmitter, and said selectively activated vehicle disabling means further including an acoustic detector mounted in said vehicle adjacent said beeper-receiver unit and tuned so as to be activated by emission of said audible paging signal by said beeper-receiver unit, said vehicle disabling means directly responsive to said audible paging signal emitted from said beeper-receiver unit.

2. The security system according to claim 1 further including a vehicle motion sensor activated by said selectively operable vehicle disabling means, and a monitor transmitter turned on upon detection of vehicle motion by the sensor to broadcast a silent alarm signal.

3. The security system according to claim 1 further including a motion sensor activated by said beeper-receiver unit to thereafter generate a signal upon motion of said vehicle, and a monitor transmitter turned on by said signal to broadcast a silent alarm signal.

4. The security system according to claim 2 wherein said vehicle disabling means includes an ignition kill switch.

* * * * *